United States Patent
Dillard et al.

(10) Patent No.: US 8,554,701 B1
(45) Date of Patent: Oct. 8, 2013

(54) DETERMINING SENTIMENT OF SENTENCES FROM CUSTOMER REVIEWS

(75) Inventors: Logan L. Dillard, Seattle, WA (US); Eric B. Fox, Seattle, WA (US); Russell A. Dicker, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 315 days.

(21) Appl. No.: 13/051,309

(22) Filed: Mar. 18, 2011

(51) Int. Cl.
*G06F 15/18* (2006.01)
*G06N 99/00* (2010.01)

(52) U.S. Cl.
CPC .................................. *G06N 99/005* (2013.01)
USPC .......................................................... 706/12

(58) Field of Classification Search
None
See application file for complete search history.

(56) References Cited

U.S. PATENT DOCUMENTS

| | | | |
|---|---|---|---|
| 7,660,749 | B2 | 2/2010 | Koski |
| 2006/0129446 | A1 | 6/2006 | Ruhl et al. |
| 2008/0082499 | A1 | 4/2008 | Koski |
| 2008/0249764 | A1* | 10/2008 | Huang et al. ...................... 704/9 |
| 2010/0169317 | A1* | 7/2010 | Wang et al. ................... 707/736 |
| 2011/0099133 | A1* | 4/2011 | Chang et al. .................... 706/12 |
| 2011/0112995 | A1* | 5/2011 | Chang et al. .................... 706/12 |
| 2011/0184729 | A1* | 7/2011 | Nam ................................ 704/9 |
| 2012/0078918 | A1 | 3/2012 | Somasundaran et al. |
| 2012/0123992 | A1 | 5/2012 | Randall |

OTHER PUBLICATIONS

Pang, Bo et al.; "Thumbs up? Sentiment Classification using Machine Learning Techniques"; 2002; Association for Computational Linguistics; Proceedings of the ACL-02 conference on Empirical methods in natural language processing=vol. 10; 8 pages.*

Kim, Soo-Min; et al.; "Determining the Sentiment of Opinions"; 2004; Association for Computational Linguistics; Proceedings of the 20th international conference on Computational Linguistics; 7 pages.*

Hu, Minqing et al.; "Mining and Summarizing Customer Reviews"; 2004; ACM; Proceedings of the tenth ACM SIGKDD international conference on Knowledge discovery and data mining; pp. 168-177.*

Ku, Lun-Wei et al.; "Opinion Extraction, Summarization and Tracking in News and Blog Corpora"; 2006; AAAI; Proceedings of AAAI—2006 spring symposium on computational approaches to analysing weblogs (vol. 2001); 8 pages.*

Koppel, Moshe et al.; "The Importance of Neutral Examples for Learning Sentiment"; 2006; Computational Intelligence 22, No. 2; 9 pages.*

(Continued)

*Primary Examiner* — Jeffrey A Gaffin
*Assistant Examiner* — Stanley K Hill
(74) *Attorney, Agent, or Firm* — Hope Baldauff, LLC

(57) ABSTRACT

Technologies are described herein for classifying sentences or phrases as expressing positive or negative sentiment based on machine learning from training data comprising sentences manually labeled as to sentiment. A list of terms is generated from the manually labeled sentences and sentiment scores are determined for the terms in the list of terms based on the manually labeled sentences. A collection of sentences or phrases may then be classified as to sentiment utilizing one or more logistic regression classifiers trained on the sentiment scores determined for the terms in the list of terms. The classified collection of sentences may be further analyzed to determine an overall majority sentiment regarding a topic discussed in the sentences and/or to extract specific sentences or phrases expressing a particular sentiment for display to a customer.

28 Claims, 6 Drawing Sheets

(56) References Cited

OTHER PUBLICATIONS

Ku, Lun-Wei et al.; "Using Polarity Scores of Words for Sentence-level Opinion Extraction"; 2007; Proceedings of NTCIR-6 workshop meeting; 7 pages.*

Tang, Huifeng et al.; "A survey on sentiment detection of reviews"; 2009; Elsevier; Expert Systems with Applications 36; pp. 10760-10773.*

Chen, E. "Edwin Chen's Blog" [online][retrieved on Jul. 18, 2013] retrieved from http://blog.echen.me/2011/08/22/introduction-to-latent-dirichlet-allocation/, 11 pps.

U.S. Official Action dated Jun. 20, 2013 in U.S. Appl. No. 13/097,233, filed Apr. 29, 2011, First Named Inventor: Eric B. Fox.

U.S. Official Action dated Jun. 25, 2013 in U.S. Appl. No. 13/164,181, filed Jun. 20, 2011, First Named Inventor: Eric B. Fox.

* cited by examiner

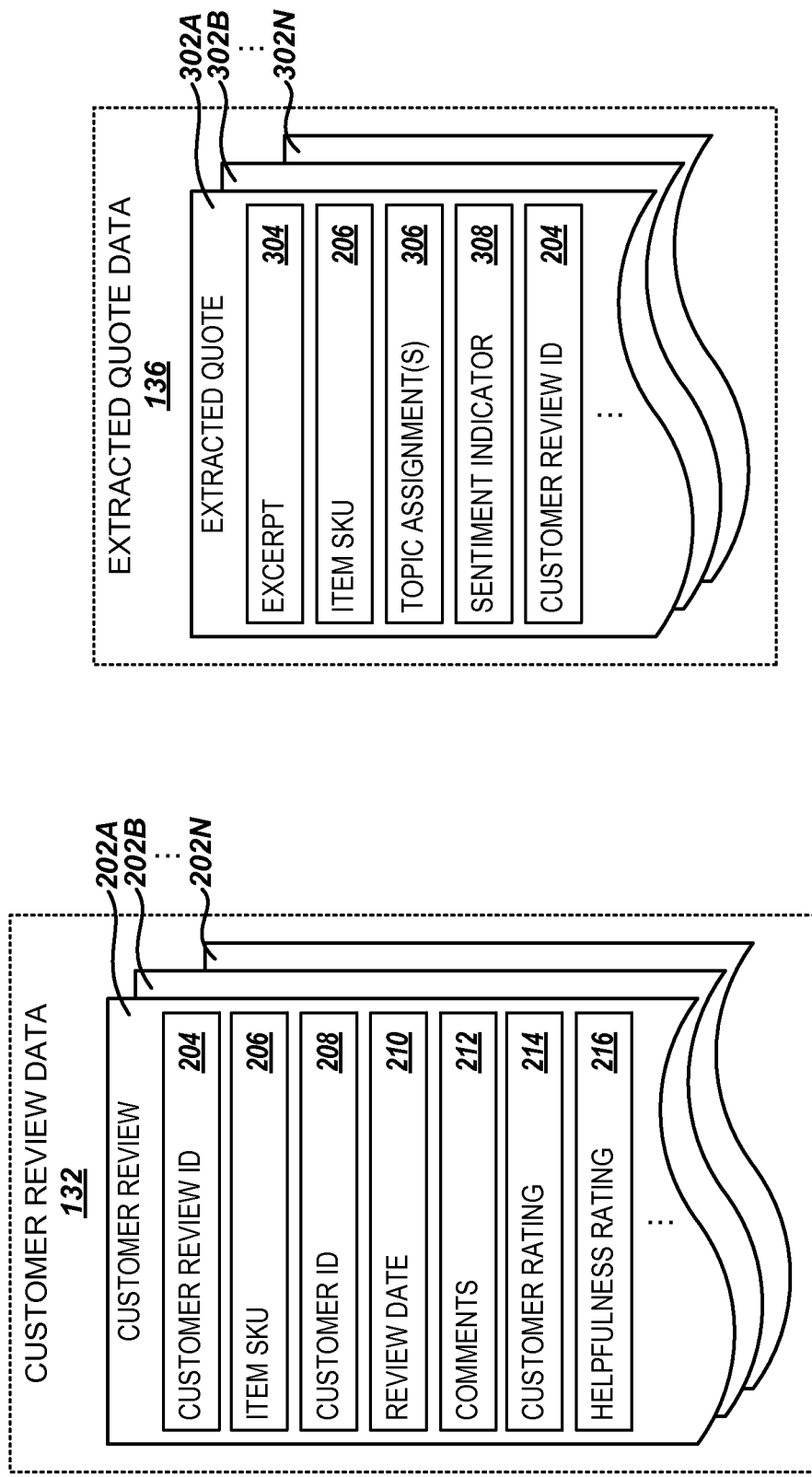

DETERMINING SENTIMENT OF SENTENCES FROM CUSTOMER REVIEWS

BACKGROUND

An online merchant may provide a number of items for sale to customers over the Internet. These items may include goods, services, digital media, downloadable music, streaming movies, and the like. Customers may access information regarding the available items through a website or other information service provided by the online merchant. The information regarding the items may include that information needed by the customer to identify and purchase a particular item, such as the name and description of the item, the price and availability of the item, and the like. In order to enhance the online shopping experience and allow the customer to fully research a particular item, the online merchant may provide additional item information along with the purchase information. The additional item information may include details or technical specifications for the item, a list of features, and customer reviews of the item.

The customer reviews may allow a potential purchaser to evaluate what other customers think about the item. The customer reviews may include a quantitative rating of the item as well as free-form comments provided by the customers regarding their impression of the item and its features, their experience with the item, their overall satisfaction with the item, and the like. For many popular items available from the online merchant, there may exist hundreds or thousands of customer reviews, covering many varied aspects of the item. However, this large number of reviews may present too much information for some customers to digest, even if provided with tools to sort the reviews by rating, helpfulness, and other qualifiers of the reviews. Accordingly, the vast amount of helpful information contained in the customer reviews for an item may go untapped by potential purchasers.

It is with respect to these and other considerations that the disclosure made herein is presented.

BRIEF DESCRIPTION OF THE DRAWINGS

FIG. 2 is a data structure diagram illustrating a number of data structures and elements maintained in customer review data, according to embodiments presented herein;

FIG. 3 is a data structure diagram illustrating a number of data structures and elements maintained in extracted quote data, according to embodiments presented herein;

DETAILED DESCRIPTION

Figure 1:
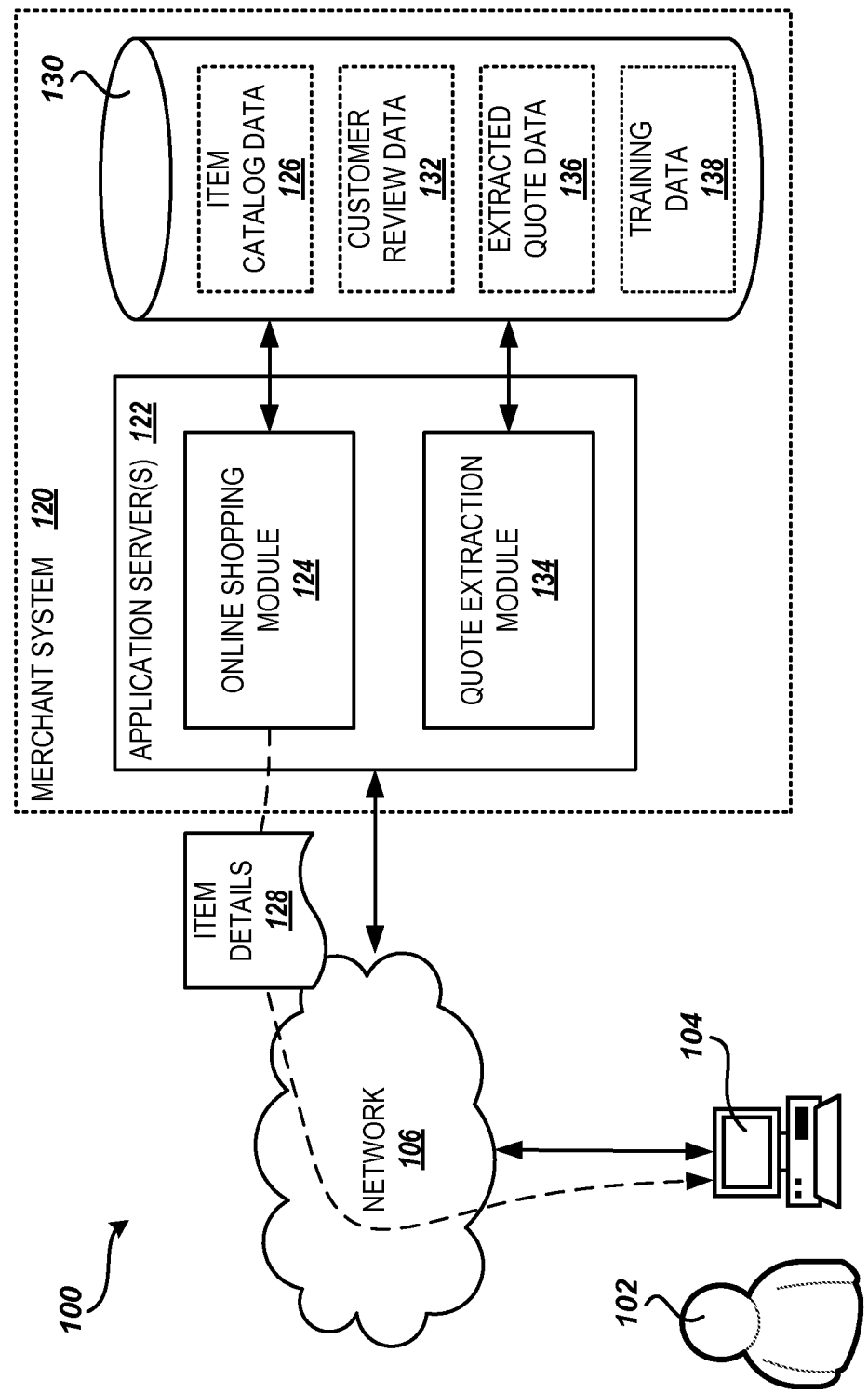
FIG. 1 is a system diagram showing aspects of an illustrative operating environment for extracting quotes regarding the most relevant topics for an item from customer reviews, including several software and hardware components provided by embodiments presented herein.

The following detailed description is directed to technologies for extracting quotes from customer reviews. Utilizing the technologies described herein, an online merchant may summarize the vast amount of information contained in customer reviews for an item by extracting representative quotes from the customer reviews and displaying them to the customer in lieu of or in conjunction with the customer reviews along with other item information. Customers viewing the extracted quotes may be able to quickly determine which aspects of an item are being discussed most in the customer reviews, as well as get a feeling for the sentiment of the customers towards those aspects and the item overall.

According to embodiments, individual sentences or phrases contained in customer reviews regarding an item or category of items are parsed into a collection of sentences. A list of topics is generated from the collection of sentences, and each sentence or phrase is assigned to a topic from the list of topics. The most relevant topics from the list of topics are identified for a particular item, and one or more sentences or phrases from customer reviews for the particular item are selected for each of the most relevant topics that best represent all the sentences associated with the item assigned to that topic, according to content and sentiment.

The technologies described herein further provide a method of classifying sentences or phrases as expressing a positive, a negative, or a neutral sentiment based on machine learning from training data comprising sentences manually labeled as to sentiment. According to further embodiments, a list of terms is generated from the manually labeled sentences and sentiment scores are determined for the terms in the list of terms based on the manually labeled sentences. A collection of sentences or phrases may then be classified as to sentiment utilizing one or more logistic regression classifiers trained on the sentiment scores determined for the terms in the list of terms. The classified collection of sentences may be further analyzed to determine an overall majority sentiment regarding a topic discussed in the sentences and/or to extract specific sentences or phrases expressing a particular sentiment for display to a customer, for example.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 including several software components for extracting quotes from customer reviews. The environment 100 includes a customer 102 that uses a customer computer 104 to access a merchant system 120 across a network 106. The customer 102 may be an individual or entity that desires to browse, research, review, and/or purchase items offered for sale by the online merchant. Items may include physical goods, such as a blender, a camera, or a CD; digital media products, such as a downloadable MP3 audio track or a streaming movie; event tickets; media or service subscriptions; or any other goods or services which can be purchased by the customer 102 and/or reviewed by customers or other users of the merchant system 120.

The customer computer 104 may be a personal computer ("PC"), a desktop workstation, a laptop, a notebook, a personal digital assistant ("PDA"), an electronic-book reader, a game console, a set-top box, a consumer electronics device, a server computer, or any other computing device capable of connecting to the network 106 and communicating with the merchant system 120. The network 106 may be a local-area network ("LAN"), a wide-area network ("WAN"), the Internet, or any other networking topology known in the art that connects the customer computer 104 to the merchant system 120.

The merchant system 120 may include a number of application servers 122 that provide various online shopping services to the customer computer 104 over the network 106. The customer 102 may use a client application executing on the customer computer 104 to access and utilize the online shopping services provided by the application servers 122. According to one embodiment, the client application may be a web browser application, such as the MOZILLA® FIREFOX® web browser from Mozilla Foundation of Mountain View, Calif. The web browser application exchanges data with the application servers 122 in the merchant system 120 using the hypertext transfer protocol ("HTTP") over the network 106. Alternatively, the client application may utilize any number of communication methods known in the art to communicate with the merchant system 120 and/or the application servers 122 across the network 106, including remote procedure calls, SOAP-based web services, remote file access, proprietary client-server architectures, and the like.

The application servers 122 may execute a number of modules in order to provide the online shopping services to the customer computer 104. The modules may execute on a single application server 122 or in parallel across multiple application servers in the merchant system 120. In addition, each module may consist of a number of subcomponents executing on different application servers 122 or other computing devices in the merchant system 120. The modules may be implemented as software, hardware, or any combination of the two.

According to one embodiment, an online shopping module 124 executes on the application servers 122. The online shopping module 124 may retrieve information regarding a particular item offered for sale by the online merchant from item catalog data 126, generate item details 128 containing the item information, and transmit the item details 128 over the network 106 to the client application for presentation to the customer 102. The item catalog data 126 may be stored in a datastore 130, such as a database or other storage mechanism available to the application servers 122 in the merchant system 120. The item catalog data 126 may contain information regarding each item offered for sale by the merchant. The item catalog data 126 may further contain information utilized to organize the items and facilitate searching, browsing, and purchasing of the items by the customer 102. For example, the item catalog data 126 may include item type and category information that allows the items in the catalog to be grouped by type or other categories. According to one embodiment, the item catalog data 126 defines category hierarchies that allow the grouping of the items in a hierarchical fashion.

The item details 128 may be contained in a web page consisting of hypertext markup language ("HTML"), extensible markup language ("XML"), and/or JavaScript object notation ("JSON") that contains the item information along with instructions regarding how the item details 128 are to be displayed on the customer computer 104. It will be appreciated that any number of methods and technologies may be utilized that allow the online shopping module 124 to encode the item information in the item details 128 and send the item details to the customer computer 104 for display to the customer 102.

According to embodiments, the item details 128 containing the item information include customer reviews. Customer reviews of individual items or collections of items from the item catalog data 126 may be provided by customers 102 utilizing a review function of the online shopping module 124, for example. The customer reviews may include quantitative ratings for the item, text-based comments regarding the item, information regarding the reviewer, and the like, as will be described in more detail below in regard to FIG. 2. The customer reviews regarding the item may be stored in customer review data 132 in the datastore 130 or other storage mechanism in the merchant system 120. The online shopping module 124 may retrieve the customer reviews from the customer review data 132 to include in the item details 128 for presentation to the customer 102. It will be appreciated that the customer review data 132 may include any free-from text comments in any format regarding items of any type, including physical products, digital media, services, and the like. In addition, the customer review data 132 may further include feedback or discussions regarding the customer reviews, comments made regarding other subjects related to the item or collection of items, and/or the like.

In another embodiment, a quote extraction module 134 executes on the application servers 122. The quote extraction module 134 may periodically scan customer reviews in the customer review data 132 in order to extract representative comments or "quotes" for items that summarize the information contained in the customer reviews for the items, both as to content and sentiment, as will be described in more detail below in regard to FIG. 4. The extracted quotes may be stored as extracted quote data 136 in the datastore 130 or other storage mechanism in the merchant system 120. The online shopping module 124 may retrieve the extracted quotes for a particular item from the extracted quote data 136 and include the quotes in the item details 128 presented to the customer 102 in lieu of or in conjunction with the customer reviews for the item.

The quote extraction module 134 may also determine the sentiment expressed by the extracted quotes or other collection of sentences or phrases contained in text-based comments in the customer review data 132. For examples, the quote extraction module 134 may classify each sentence or phrase in the collection of sentences as expressing a positive sentiment, such as "I love this blender," a negative sentiment, such as "The blades do not have enough power to grind ice," a mixed sentiment, such as "While the blender was reliable, its feature set was too small for my needs," or neutral or no sentiment, such as "I received this blender in March for my birthday." According to one embodiment, the classification of sentiment in the extracted quotes or sentences may be performed using a machine learning technique trained on sentences manually labeled for sentiment, as will be described below in regard to FIG. 5. The manually labeled sentences may be contained in training data 138 stored in the datastore 130 or other storage mechanism in the merchant system 120. In addition, the quote extraction module 134 may store other information required for the sentiment classification of the sentences in the training data 138, as will be described below.

FIGS. 2 and 3 are data structure diagrams showing a number of data elements stored in data structures. It will be appreciated by one skilled in the art that data structures shown in the figures may represent rows in a database table, instances of objects stored in a computer memory, programmatic structures, or any other data container commonly known in the art. Each data element included in the data structure may represent one or more fields or columns of a database table, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

FIG. 2 shows one example of data maintained in the customer review data 132, according to embodiments. As described above, the customer review data 132 may contain customer reviews 202A-202N (referred to herein generally as customer reviews 202) regarding an individual item or group of items offered for sale by the online merchant. For example, the customer review data 132 may contain multiple customer reviews 202 regarding a particular blender, a particular camera, a particular MP3 audio track, a collection of movies or books, and the like, provided by customers 102 of the merchant system 120. Alternatively, the customer review data 132 may contain customer reviews 202 regarding any type of product or service, including a movie, a movie theater, a store, a website, a restaurant, and the like.

Each customer review 202 contains a customer review ID 204 that allows individual customer reviews to be uniquely identified and distinguished by the online shopping module 124, the quote extraction module 134, and other modules or applications in the merchant system 120. Each customer review 202 may also contain an identifier of the associated item to which the customer review applies, such as an item stock-keeping unit ("SKU") 206 shown in FIG. 2. The item SKU 206 may be utilized by the online shopping module 124 to select the relevant customer reviews 202 to include in the item details 128 presented to the customer 102 on the customer computer 104 regarding a particular item from the item catalog data 126.

Each customer review 202 may further contain a customer ID 208 that identifies the customer 102 or other user that provided the customer review. The customer ID 208 may consist of a user ID, a customer number, a customer name, a handle, an email address, or any combination of these and other information that may uniquely identify a particular customer 102 or user of the merchant system 120. A customer handle, location, and/or other information regarding the customer providing the review may be presented with each customer review 202 shown by the online shopping module 124, for example. Each customer review 202 may also include a review date 210 indicating when the customer review was created.

According to embodiments, each customer review 202 further contains comments 212. The comments 212 may include free form text provided by the customer 102 regarding the associated item. It will be appreciated that the comments 212 may include one or more sentences or phrases regarding any information directly or indirectly related to the associated item. For example, in a customer review 202 regarding a CD, the comments 212 may contain sentences related to the type of music contained on the album, individual tracks on the album, the source of the album's tracks, other tracks or albums by the same artist, production quality of the recording, the artist's lifestyle or behaviors, and the like.

Each customer review 202 may further contain a customer rating 214 that provides a quantitative evaluation of the associated item. For example, the customer rating 214 may be a number from one to five indicating overall satisfaction of the customer 102 with the associated item. In another embodiment, each customer review 202 also contains a helpfulness rating 216. The helpfulness rating 216 may indicate whether other customers 102 or users of the merchant system 120 find the comments 212 in the customer review 202 helpful or not, based on feedback supplied by the other customers. It will be appreciated that additional data elements may be maintained in the customer review data 132 for each customer review 202 beyond those described herein, and that not every data element described will be available for every customer review 202 in the customer review data 132.

FIG. 3 shows one example of data maintained in the extracted quote data 136, according to embodiments. As described above, the extracted quote data 136 may contain extracted quotes 302A-302N (referred to herein generally as extracted quote 302) extracted by the quote extraction module 134 from the customer review data 132. Each extracted quote 302 contains an excerpt 304 comprising a text-based comment from a customer review 202. The excerpt 304 may contain one or more representative sentences or phrases extracted from customer reviews 202 for an item or group of items that summarizes the information contained in the customer reviews for the items, both as to content and sentiment, as will be described in more detail below in regard to FIG. 4. Each extracted quote 302 may further contain an item SKU 206 identifying the item to which the excerpt 304 applies. The item SKU 206 may be utilized by the online shopping module 124 to select the relevant extracted quotes 302 to include in the item details 128 presented to the customer 102 on the customer computer 104 regarding a particular item.

According to embodiments, each extracted quote 302 may also contain topic assignment(s) 306 and a sentiment indicator 308. As will be further described below in regard to FIG. 4, the topic assignment(s) 306 may indicate one or more general topics regarding the item to which the sentence(s) in the excerpt 304 are directed, while the sentiment indicator 308 may provide an indication of the sentiment expressed by the excerpt. The topic assignment(s) 306 and sentiment indicator 308 for the extracted quote may be established by the quote extraction module 134 in the quote extraction process, as described below. The online shopping module 124 may further utilize the topic assignment(s) 306 and/or the sentiment indicator 308 to select the extracted quotes 302 to present to the customer along with the item details 128, as is described below in regard to FIG. 6.

Each extracted quote 302 may also contain the customer review ID 204 identifying the original customer review 202 from which the excerpt 304 was extracted. The online shopping module 124 may utilize the customer review ID 204 to retrieve information from the original customer review 202 that may be presented with the extracted quote 302, such as an identity or handle of the posting customer, the date the customer review was posted, the overall customer rating 214 from the review, the helpfulness rating 216 given the review, and the like. It will be appreciated that additional data elements may be maintained in the extracted quote data 136 for each extracted quote 302 beyond those described herein, and that not every data element described will be available for every extracted quote 302 in the extracted quote data 136.

Figure 4:
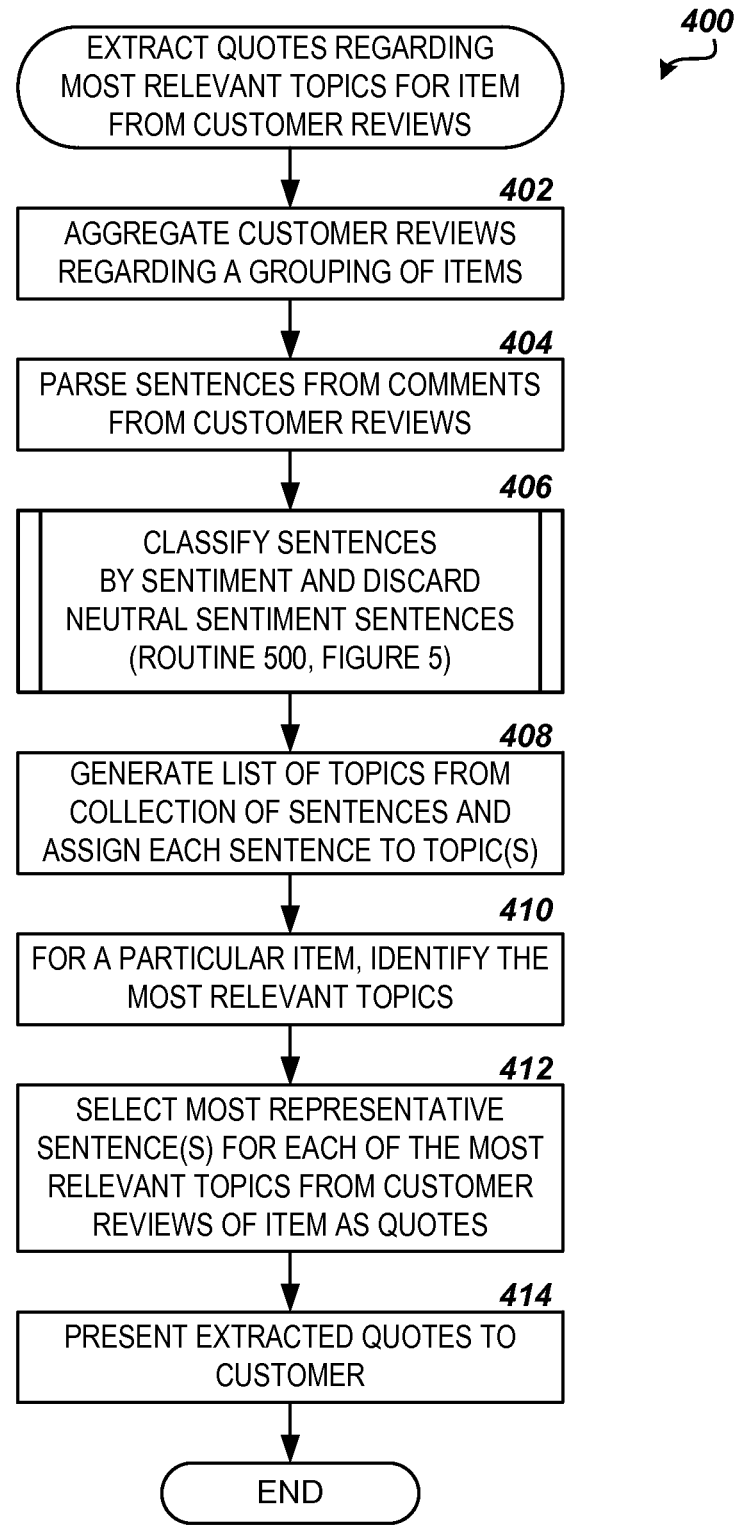
FIG. 4 is a flow diagram for a method of extracting quotes for the most relevant topics for an item from customer reviews of the item, according to embodiments described herein.
Figure 5:
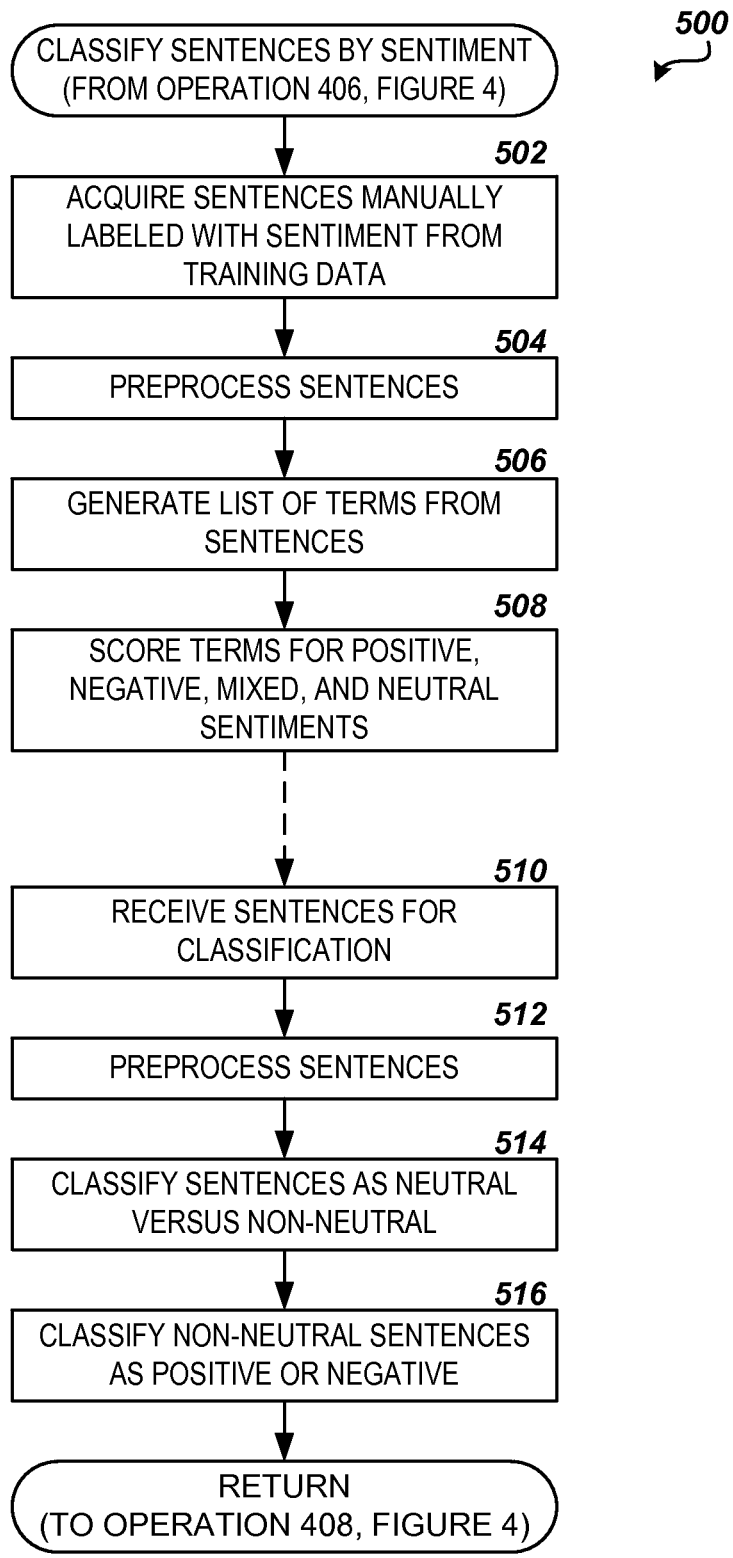
FIG. 5 is a flow diagram for a method of classifying sentences as to sentiment utilizing machine learning techniques, according to embodiments described herein.

Turning now to FIGS. 4 and 5, additional details will be provided regarding the embodiments described herein for extracting quotes from customer reviews. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 illustrates a routine 400 for extracting quotes regarding the most relevant topics discussed in customer reviews of an item, according to one embodiment described herein. The routine 400 may be performed by the quote extraction module 134, as described above in regard to FIG. 1. It will be appreciated that the routine 400 may also be performed by other modules or components executing on the application servers 122 in the merchant system 120, or by any other combination of modules and components. It will be further appreciated that, while the routine 400 is described as a sequence of operations, groups of operations may be performed at different times, and some operations may be performed iteratively for different items using the outputs of previously performed operations, as indicated below.

The routine 400 begins at operation 402, where the quote extraction module 134 aggregates customer reviews 202 from the customer review data 132 for a group of items in the item catalog data 126. Because the types of topics discussed for different types of items may be different, the quote extraction process may produce more salient topics when executed across items of similar type. For example, the most relevant topics determined for a group of items consisting of small appliances may include reliability of the item, the quality of the construction of the item, the price or value of the item, and the like. However, the most relevant topics determined for a group of items consisting of blenders may include one or more of these same topics, along with ice crushing ability, the number of speeds available, the life-expectancy of the blender, and the like.

In one embodiment, the quote extraction module 134 utilizes the category hierarchies defined for items in the item catalog data 126 to select a category of items, such as all blenders. The selection of the category of items may be narrow enough to generate the most salient topics for the items in the selected category but broad enough to contain sufficient customer reviews 202 to produce accurate quote extraction. The quote extraction module 134 then aggregates the customer reviews 202 from the customer review data 132 associated with those items in the item catalog data 126 belonging to the selected category. It will be appreciated that the group of items selected for aggregation of the associated customer reviews 202 may be as broad as all items in the item catalog and as narrow as a particular item. According to another embodiment, the quote extraction module 134 further aggregates feedback or discussions regarding the customer reviews, comments made regarding other subjects related to the items or group of items, and/or the like from the customer review data 132 along with the customer reviews 202.

The routine 400 proceeds from operation 402 to operation 404, where the quote extraction module 134 parses individual sentences or phrases from the comments 212 of the aggregated customer reviews 202 to create a collection of sentences. It will be appreciated that individual sentences or phrases contained in the comments 212 from a customer review 202 may discuss a variety of topics directly or indirectly related to the associated items. In one embodiment, the quote extraction module 134 parses individual sentences from the comments 212 for the collection of sentences in order to determine the various topics discussed across the aggregated customer reviews 202. The quote extraction module 134 may further parse simple sentences, phrases, or other grammatical constructs (referred to herein generally as "sentences") from complex or compound sentences in the comments 212 in order to better distill multiple topics discussed in the sentences. For example, the quote extraction module 134 may break the compound sentences on commas, coordinating conjunctions, or other transition words or terms in order to parse the simple sentences and phrases for the collection of sentences from the comments 212 of the aggregated customer reviews 202. It will be further appreciated that the quote extraction module 134 may utilize other methods of syntactic analysis to parse the sentences and/or phrases from the comments 212 of the aggregated customer reviews 202.

From operation 404, the routine 400 proceeds to operation 406, where the quote extraction module 134 classifies each of the individual sentences in the collection of sentences with a sentiment. In addition, once a sentiment for each sentence has been determined, the quote extraction module 134 removes those sentences having neutral sentiment from the collection of sentences before proceeding to identify the topics contained in the collection of sentences. Since a neutral sentiment sentence does not express a like or dislike of an item or aspect of the item, these sentences would likely not serve as salient quotes regarding a topic for a particular item that would provide a potential purchaser with a sense of how other customers feel regarding the topic. According to one embodiment, the quote extraction module 134 may use the method described below in regard to FIG. 5 to classify the sentences or phrases for sentiment and to discard those sentences having neutral sentiment from the collection of sentences. Alternatively, the quote extraction module 134 may utilize other methods known in the art for determining the sentiment for each sentence.

The routine 400 proceeds from operation 406 to operation 408, where the quote extraction module 134 analyzes the sentences in the collection of sentences to generate a list of topics discussed across the collection of sentences. Each sentence in the collection of sentences is further assigned to one or more of the topics from the list of topics based on the analysis. In one embodiment, the quote extraction module 134 utilizes latent Dirichlet allocation ("LDA") to discover the abstract topics that occur in the collection sentences. The LDA mechanism may provide better topic discovery results than other statistical analysis methods, such as clustering, because it better handles issues in text, such as a single word that has multiple meanings LDA also produces probability distributions over topics for each sentence, which may be utilized to assign topics to each of the sentences.

The implementation of LDA utilized by the quote extraction module 134 may utilize automatic methods of model selection. For example, the quote extraction module 134 may iteratively repeat the analysis while incrementing the number of topics until the perplexity improves by less than 2%. This may lead to repeatability of results for a given collection of sentences aggregated from one particular category of items, while allowing the parameters of the model to adjust for other categories of items. Alternatively, other methods of model selection may be utilized, such as using a metric similar to Akaike's information criterion ("AIC"). Other extensions to the LDA implementation that may be utilized by the quote extraction module 134 include producing hierarchies of topics.

From operation 408, the routine proceeds to operation 410, where the quote extraction module 134 selects the most relevant topics from the list of topics for a particular item. According to one embodiment, the most relevant topics for the particular item represent the topics most discussed in the customer reviews 202 associated with that item. The quote extraction module 134 selects the top-most N topics assigned to the most sentences parsed from the customer reviews 202 associated with the particular item as the relevant topics. The number N of topics may vary depending on the information requirements for the extracted quotes 302 to be presented to the customer 102. For example, the quote extraction module 134 may select three to five most relevant topics for each particular item.

The routine proceeds from operation 410 to operation 412, where the quote extraction module 134 selects one or more representative sentences from among the sentences parsed from the customer reviews 202 associated with the particular item for each of the identified most relevant topics. In one embodiment, the most representative sentence(s) for a topic are those sentences that are representative both in terms of sentiment and in terms of subject matter. In order to select the most representative sentence(s) for a topic, the quote extraction module 134 first determines the majority sentiment (positive or negative) from the sentences assigned to that topic for the item. From among those sentences expressing the majority sentiment, the quote extraction module 134 then selects the one or more sentences that are most relevant to the topic. According to one embodiment, the quote extraction module 134 chooses the most the representative sentence using cosine similarity with term frequency-inverse document frequency ("TF-IDF") weighting. Alternatively, the quote extraction module may utilize a graph-based centrality algorithm, such as LexRank, with TF-IDF to determine the most relevant sentence to the topic.

The selected sentences may be further filtered in order to extract the most salient quotes for presentation to the customer 102. For example, the quote extraction module 134 may filter the selected sentences for a minimum specificity in order to remove sentences with broad language, such as "I love it," and favor more specific sentences such as "I love it because it has ample speed settings for different tasks." The quote extraction module may utilize TF-IDF scores of terms in the selected sentences as to the overall collection of sentences. The sentences with a high average of TF-IDF scores may be selected as more specific to the assigned topic. In addition, the extracted sentences may be filtered by a minimum readability level, based on number of words in the sentence, a minimum average word length, and/or other methods of approximating the readability of the sentence.

In further embodiments, the quote extraction module 134 may utilize other means to improve the quality of the selected sentences, such as only selecting sentences from customer reviews 202 having a minimum helpfulness rating 216 and the like. Once the most representative sentence(s) for the most relevant topics for the item have been selected, the quote extraction module 134 may store the selected sentences in the extracted quote data 136 for later presentation to the customer 102. For example, the quote extraction module 134 may store each selected representative sentence as an excerpt 304 in a new extracted quote 302 related to the particular item through the item SKU 206.

The topic assignment(s) 306 for the sentence contained in the excerpt 304 may also be stored in the extracted quote 302. In one embodiment, the topic assignment(s) 306 may be ordinal numbers that allows extracted quotes 302 containing sentences assigned to the same identified most relevant topic to be grouped together. In another embodiment, the topic assignment(s) 306 may comprise a topic label assigned to each topic that can be presented along with the extracted quotes 302 to the customer 102. The topic labels may be determined automatically by the quote extraction module 134. For example, the quote extraction module 134 may utilize word stemming and TF-IDF to select the most used and relevant term or sequence of terms from among the sentences assigned to the topic as the topic label. Alternatively, because the topics discussed in customer reviews 202 for a particular category of items may tend to be consistent over time, the most prevalent topics in the list of topics generated for the category of items may be labeled manually by merchant system personnel or through crowd-sourcing and the labels retained with the list of topics in the datastore 130 or other storage mechanism. It will be appreciated that other methods of labeling the topics assigned to the selected representative sentences may be utilized by the quote extraction module 134, and it is intended that all such methods of topic labeling be included herein.

The quote extraction module 134 may further store a sentiment indicator 308 for each selected sentence in the corresponding extracted quote 302 indicating the sentiment classification determined for the sentence at operation 406. The online shopping module 124 and/or other modules of the merchant system 120 may utilize the sentiment indicator 308 to select extracted quotes 302 related to an item expressing a desired sentiment for presentation to customers 102 along with the item details 128. In addition, the quote extraction module 134 may store the customer review ID 204 of the customer review 202 from which the excerpt 304 was extracted in the new extracted quote 302. The customer review ID 204 may be utilized to retrieve information from the original customer review 202 that may be presented with the extracted quote 302, such as an identity or handle of the posting customer, the date the customer review was posted, the overall customer rating 214 from the review, the helpfulness rating 216 given the review, and the like.

It will be appreciated that the operations 410 and 412 may be repeated iteratively for a number of items belonging to the group or category of items from which the customer reviews 202 were aggregated and the list of topics generated. In addition, the collection of sentences along with the topic assignment and sentiment determined for each sentence at operation 408 may be stored in the datastore 130 or other storage mechanism, and the quote extraction module 134 may perform operations 410 and 412 for a requested item at a later time in order to extract one or more sentences for each of the most relevant topics and store them in extracted quotes 302 in the extracted quote data 136.

According to one embodiment, from operation 412, the routine 400 proceeds to operation 414, where the extracted quotes 302 are displayed to the customer 102 or other user of the merchant system 120. For example, the extracted quotes 302 may be included in the item details 128 sent to the customer computer 104 by the online shopping module 124 and presented to the customer 102 in conjunction with the item information, as described below in regard to FIG. 6. In addition, the online shopping module 124 may provide the customer 102 with the ability to interact with the presented extracted quotes 302, such as allowing the customer to see other extracted quotes regarding the same topic as a selected quote, allowing the customer to retrieve and view the customer review 202 from which the quote was extracted, allowing the customer to search for other items having extracted quotes with a positive and/or negative sentiment regarding the topic addressed by a selected quote, and the like. It will be further appreciated that the online shopping module 124 and/or other modules in the merchant system 120 utilize the extracted quotes 302 in the extracted quote data 136 to provide other services to customers 102 and other users of the system beyond those described herein.

TABLES 1 and 2 provide examples of quotes that may be extracted from customer reviews 202 for an item utilizing the above described method. TABLE 1 shows one quote containing the most representative sentence for each of three most relevant topics discussed in customer reviews 202 regarding a particular blender (the "Brand X Professional Series Blender"). The most relevant topics for the particular blender were selected from among a list of topics generated from customer reviews 202 regarding the category of items of "blenders" and labeled in a manner described above.

TABLE 1

Extracted Quotes for a Blender
Blenders—Brand X Professional Series Blender (SKU # KL0031493)

Ice Crushing—"It crushed the ice and blended frozen fruit and juice into a smoothie without a hitch."
Speeds—"The 2 speeds (on/pulse) are perfect for everything the average person needs it for, personally I think any other blender that boasts 8-12 different speeds is simply an advertising gimmick and completely unnecessary."
Styling—"Overall it's a great blender and the styling is really nice . . . it's very sturdy and not cheap looking/feeling at all."

Similarly, TABLE 2 shows one quote containing the most representative sentence for each of three most relevant topics discussed in customer reviews 202 regarding a particular camera (the "Brand Y Super-Shot 10 MP Camera"). The most relevant topics for the particular camera were selected from among a list of topics generated from customer reviews 202 regarding the category of items of "point and shoot cameras" and labeled in a manner described above.

TABLE 2

Extracted Quotes for a Camera

P&S Cameras - Brand Y Super-Shot 10 MP Camera (SKU # YZ93493-K)

Low Light - "I love taking pictures and really wanted one that did great low light pictures and this definitely takes great pictures with very little light."

TABLE 2-continued

Extracted Quotes for a Camera

P&S Cameras - Brand Y Super-Shot 10 MP Camera (SKU # YZ93493-K)

SLR - "It is a great camera that is comparable to any SLR camera."
Zoom - "Also the video is just as high quality, you can optically zoom during video recording, and the focus seems quicker during zooming."

FIG. 5 illustrates a routine 500 for classifying sentences or phrases parsed from the customer reviews 202 for sentiment and to discard those sentences having neutral sentiment from the collection of sentences, according to one embodiment. The routine 500 uses a machine learning technique that takes sentences manually labeled in terms of sentiment and learns which words and sequence of words make a sentence positive, negative, mixed, or neutral. The routine 500 then utilizes logistic regression classifiers trained on the sentiment classifications of these words and sequences of words to determine a sentiment for each sentence or phrase in the collection of sentences. The routine 500 may be performed by the quote extraction module 134, as described above in regard to FIG. 1. It will be appreciated that the routine 500 may also be performed by other modules or components executing on the application servers 122 in the merchant system 120, or by any other combination of modules and components. It will be further appreciated that, while the routine 500 is described herein as classifying sentences in the collection of sentences parsed from the aggregated customer reviews, the method described may be utilized to classify sentiment in sentences, phrases, or other documents from any other corpus based on machine learning acquired from manually labeled documents from the same or similar corpus.

The routine 500 begins at operation 502, where the quote extraction module 134 acquires manually labeled sentences from the training data 138. According to one embodiment, the training data 138 comprises sentences parsed from the comments 212 of customer reviews 202 from the customer review data 132 in the merchant system 120. Because the terminology used to discuss and express sentiment regarding different types of items may be different, the sentences in the training data 138 may be extracted from customer reviews 202 regarding the same group or category of items as the collection of sentences to be classified. Alternatively, the sentences comprising the training data 138 may include selected sentences from recent customer reviews 202 across broader classifications of items. For example, the manually labeled sentences in the training data 138 may be divided into media-type items and non-media type items. The quote extraction module 134 may perform the sentiment analysis using training data 138 from the most appropriate classification of items for the collection of sentences to be classified.

The sentences comprising the training data 138 are further labeled with a sentiment indicating that the sentence expresses a positive sentiment, a negative sentiment, a mixed sentiment, or neutral or no sentiment. The sentences comprising the training data 138 may be labeled with sentiment by merchant system personnel or through crowd-sourcing. It will be appreciated that the labeled sentences comprising the training data 138 may be gathered from other sources, as well.

The routine 500 proceeds from operation 502 to operation 504, where the quote extraction module 134 preprocesses the sentences comprising the training data 138 to increase the accuracy of the classification process and account for the nuances of the applied machine learning techniques. For example, the quote extraction module 134 may convert the sentences comprising the training data 138 to lowercase and remove punctuation, stopwords, and any formatting characters, such as HTML or special characters. The quote extraction module 134 may also expand contractions, changing "don't" to "do not," for example.

According to one embodiment, the quote extraction module 134 performs further pre-processing to handle negation words. For example, the quote extraction module 134 may concatenate negation words or terms, such as "no," "not," and "none" with the next word or sequence of words in order to create tokens that more appropriately reflect the sentiment of the words. Accordingly, "no problem" may become "noproblem" in order to preserve the meaning of the word combination. Similarly, interceding adverbs may be included in the concatenation, such that "not very good" may become "notverygood" and the like. Alternatively or additionally, the quote extraction module 134 may utilize a parsing algorithm to determine the sentence structure and decide the words of the sentence to which the negation applies. The quote extraction module 134 may also be able to detect the use of sarcasm and substitute the appropriate words for negation. Other n-gram modeling may be applied to the sentences to compose the words into unigrams, bigrams, and trigrams, as is common in natural language processing.

From operation 504 the routine proceeds to operation 506, where the quote extraction module 134 parses individual words, sequences of words, and tokens from the pre-processed sentences to generate a list of terms. Next, at operation 508, the quote extraction module 134 applies machine learning techniques to score each word or term in the list of terms as to positive, negative, mixed, and neutral sentiment based on the labeled sentences in the training data 138 in which the words and terms occur. For example, the quote extraction module 134 may apply a logistic regression classifier or maximum entropy classifier to determine the sentiment scores for each term in the list of terms. According to embodiments, the sentiment scores for the words and terms in the list of terms are used as coefficients in logistic regression classifiers used to classify the sentences in the collection of sentences, as will be described below.

In one embodiment, the list of terms may be reduced in order to retain terms that represent the best indicators of sentiment, thus improving accuracy in the classification process and avoiding negatives-labeled-as-positives and positives-labeled-as-negatives errors. For example, the number of terms in the list of terms may be reduced by applying thresholds for the scores for positive, negative, mixed, and/or neutral sentiments for which terms are retained. The number of terms may be further reduced using other feature selection techniques, such as minimum feature occurrence or minimum chi-square value. The list of terms and their corresponding sentiment scores may be stored for future sentiment classification processing, as is described below. According to one embodiment, the list of terms and their corresponding sentiment scores are stored in the training data 138.

The routine 500 proceeds from operation 508 to operation 510, where the quote extraction module 134 receives a collection of sentences of phrases for classification as to sentiment. For example, the quote extraction module 134 may receive the collection of sentences parsed from the aggregated customer reviews, as described above in regard to operation 406. From operation 510, the routine 500 proceeds to operation 512, where the quote extraction module 134 pre-processes the sentences in the collection sentences using the same techniques utilized for the sentences comprising the training data 138 described above in regard to operation 504. In one embodiment, the quote extraction module 134 also adds a token to each sentence to represent the customer rating 214 from the customer review 202 from which the sentence was extracted. For example, for a sentence parsed from a customer review 202 containing a customer rating 214 with a value of five, the quote extraction module may add the token "5_STAR_RATING" to the sentence during pre-processing. The customer rating tokens added to the sentences may be utilized as a coefficient in the logistic regression classifiers in order to improve the accuracy of the classification process, as described below.

From operation 512, the routine 500 proceeds to operation 514, where the quote extraction module 134 distinguishes the sentences in the collection of sentences having a neutral sentiment from those sentences having a non-neutral sentiment. In one embodiment, the quote extraction module 134 utilizes a single logistic regression classifier trained on the positive, negative, and mixed scores of terms as positive coefficients and the neutral sentiment scores of terms as negative coefficients to score the sentences as to non-neutral sentiment. Those sentences determined to express a neutral sentiment, i.e. those sentences with a non-neutral sentiment score below a particular threshold, may then be discarded from the collection of sentences. Utilizing a first logistic regression classifier to remove those sentences from the collection of sentences that express weak or no sentiment before further processing the sentences to classify them as to positive or negative sentiment greatly improves the accuracy of the sentiment classification process.

The routine 500 then proceeds from operation 514 to operation 516, where the quote extraction module 134 classifies each of the remaining sentences in the collection of sentences as having a positive sentiment or negative sentiment. According to one embodiment, the quote extraction module 134 may utilize two, separate logistic regression classifiers. The first logistic regression classifier is trained on the positive and mixed sentiment scores of terms as positive coefficients and the negative and neutral scores of terms as negative coefficients to score the sentence as to positive sentiment, and the second logistic regression classifier is trained on the negative and mixed sentiment scores of terms as positive coefficients and the positive and neutral scores of terms as negative coefficients to score the sentence as to negative sentiment. The positive sentiment score and the negative sentiment score for each sentence may be combined through a simple summation or by a machine learning algorithm, such as the Perceptron learning algorithm, a neural network, or the like, in order to classify the sentence as expressing a positive sentiment or a negative sentiment.

It will be appreciated that the coefficients and other parameters for the logistic regression classifiers may be adjusted to favor high levels of precision in the classifiers in order to reduce misclassifications, particularly negatives-classified-as-positives and positives-classified-as-negatives errors. These errors may cause the excerpts 304 extracted from the customer reviews 202 to misrepresent the customers' true sentiment expressed for an item or a particular topic regarding the item. In further embodiments, the quote extraction module 134 may apply further coefficients or additional levels of logistic regression classifiers to improve the accuracy of the classification process and reduce errors. For example, the quote extraction may apply a meta-classifier including the positive and negative sentiment scores from the first and second classifiers, the customer rating token, and/or the classifications from the previous and next sentences from the original comments 212 of the customer review 202. Further linguistic analysis, such as identification of sub-clauses, may further be utilized to enhance the classification process. From operation 516, the routine 500 ends.

Figure 6:
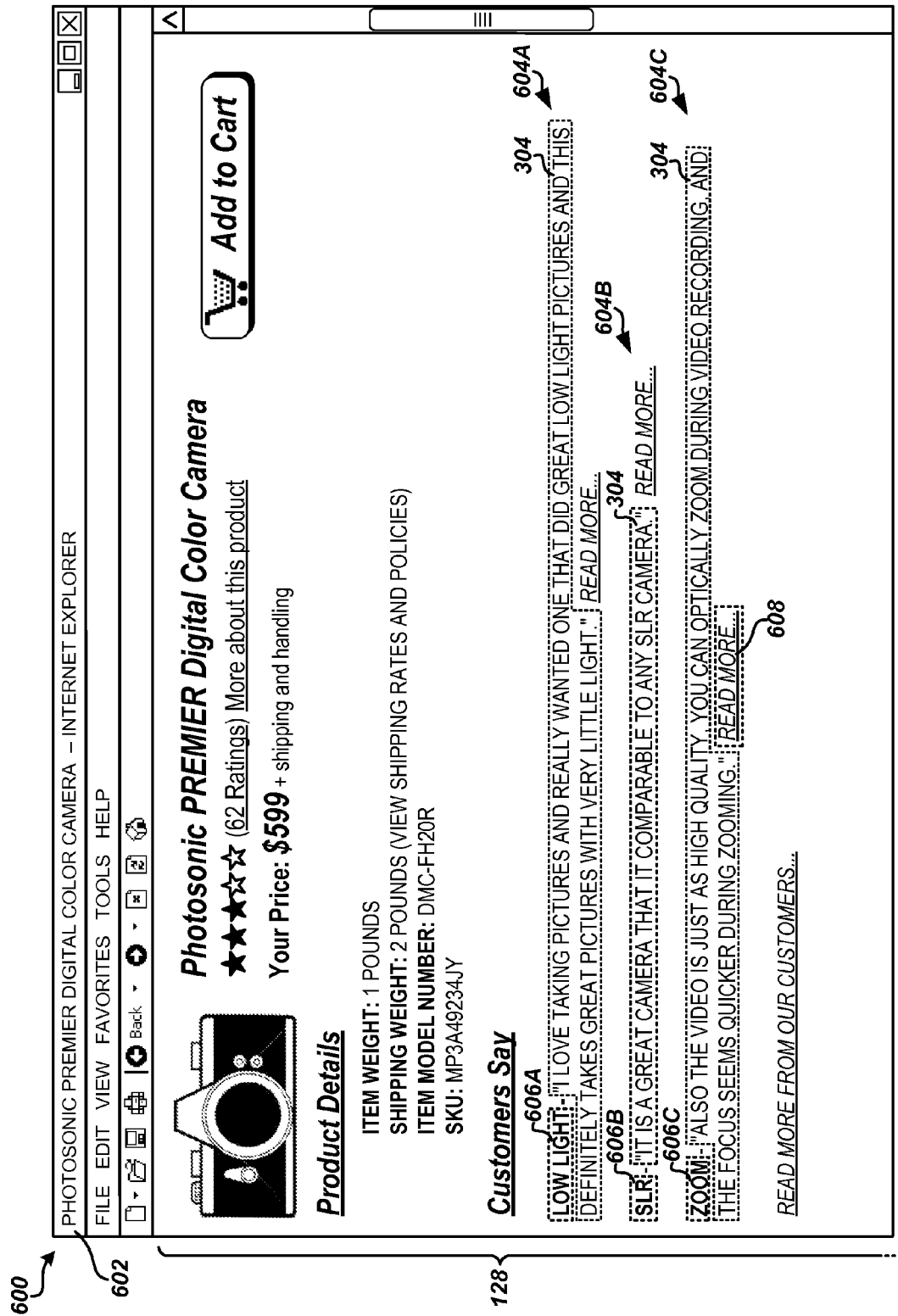
FIG. 6 is a screen diagram showing an exemplary user interface for presenting extracted quotes for the most relevant topics for a selected item, according to embodiments presented herein.

FIG. 6 shows an illustrative user interface ("UI") 600 presented to a customer 102 at a customer computer 104 containing quotes regarding the most relevant topics extracted from customer reviews 202, according to one embodiment. The UI 600 may be displayed on the customer computer 104 in conjunction with the selection of a particular item, such as a point-and-shoot camera, for review or purchase by the customer 102. In one embodiment, the UI 600 is sent by the online shopping module 124 as a Web page to be rendered in a window 602 by the client application executing on the customer computer 104, as described above in regard to FIG. 1. The UI 600 may include the item details 128 generated by the online shopping module 124 for the selected item.

According to embodiments, the UI 600 further includes one or more extracted quote displays 604A-604C (referred to herein generally as extracted quote 604) corresponding to an extracted quote 302 associated with the selected item retrieved from the extracted quote data 136. For example, the online shopping module 124 may select extracted quotes 302 associated with the item from the extracted quote data 136 having topic assignments 306 for the top-most N topics discussed in the customer reviews 202 associated with the selected item or group of items as determined by the routine 400 described above in regard to FIG. 4. Each extracted quote display 604 may include the excerpt 304 extracted from the customer reviews 202 and stored with the extracted quote 302.

In one embodiment, each extracted quote display 604 includes a topic label 606A-606C displayed along with the excerpt 304. The topic labels 606A-606C may be based on the topic assignment(s) 306 of the corresponding extracted quote 302. As further described above in regard to FIG. 4, the topic labels may be determined automatically by the quote extraction module 134, utilizing word stemming and TF-IDF to select the most used and relevant term or sequence of terms from among the sentences assigned to the topic, for example. Alternatively, because the topics discussed in customer reviews 202 for a particular category of items may tend to be consistent over time, the most prevalent topics in the list of topics generated for the category of items may be labeled manually by merchant system personnel or through crowd-sourcing and the labels retained with the datastore 130 or other storage mechanism. In another embodiment, the excerpts 304 from the extracted quotes 302 may be displayed in the extracted quote displays 604 without topic labels.

In a further embodiment, each extracted quote display 604 may contain a UI trigger control, such as the hyperlink 608 shown in FIG. 6, that allows the customer to view additional information related to the extracted quote 302. For example, the hyperlink 608 may allow the customer to view the customer rating 214, the entire comments 212, and other details from the original customer review 202 from which the excerpt 304 was extracted. The original customer review 202 may be identified by the customer review ID 204 stored with the extracted quote 302. It will be appreciated that the UI 600 may contain any number of extracted quote displays 604, and the extracted quote displays may be presented to the customer 102 in a variety of user interfaces and contexts beyond those shown in FIG. 6 and described herein. It is intended that this application include all such displays of extracted quotes.

Figure 7:
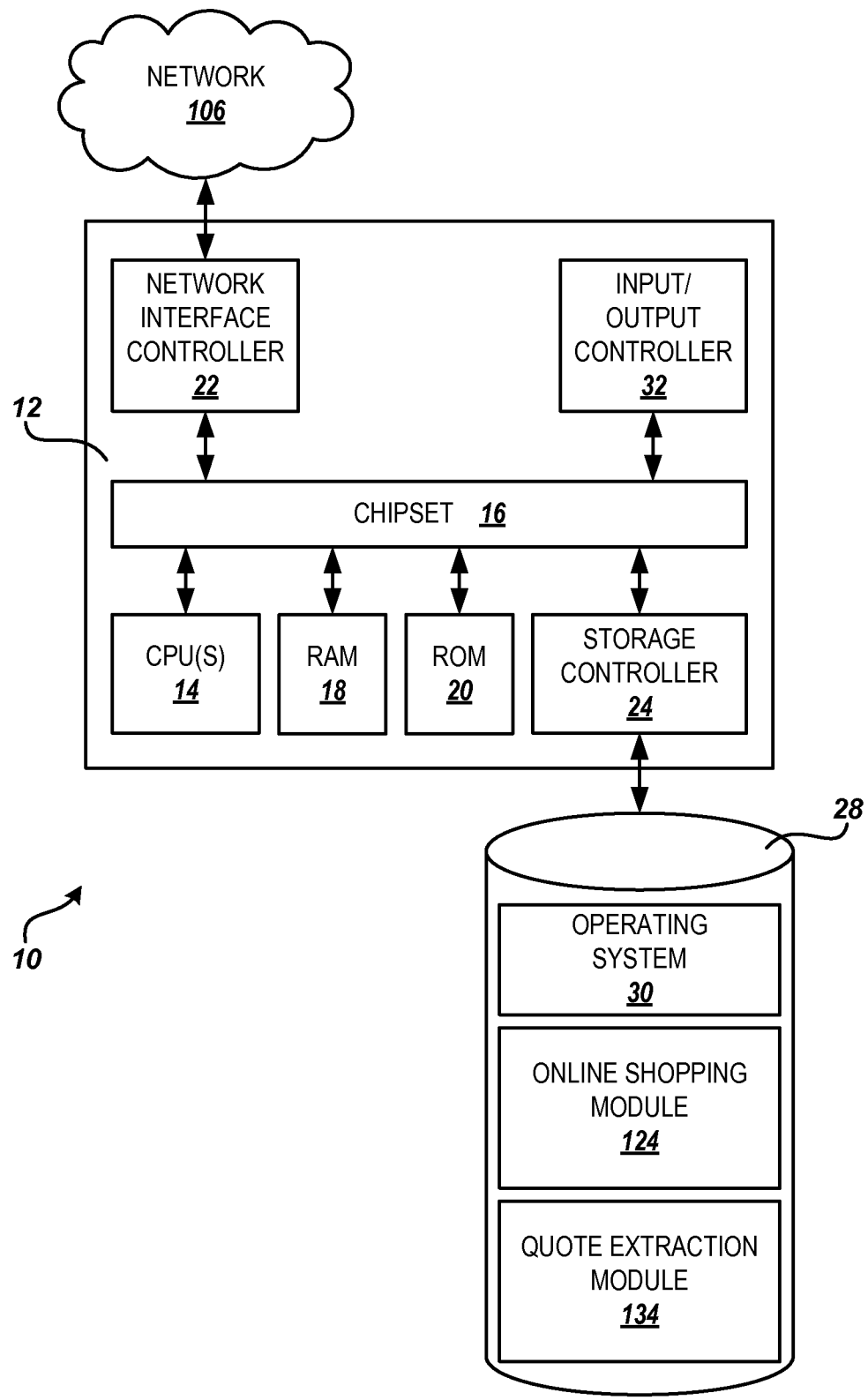
FIG. 7 is a computer architecture diagram showing an illustrative computer hardware architecture for computing devices described in embodiments presented herein.

FIG. 7 shows an example computer architecture 10 for a computer 12 capable of executing the software components described herein for extracting quotes from customer reviews, in the manner presented above. The computer architecture 10 shown in FIG. 7 illustrates a conventional server computer, workstation, desktop computer, laptop, PDA, electronic book reader, digital wireless phone, network appliance, set-top box, or other computing device, and may be utilized to execute any aspects of the software components presented herein described as executing on the application servers 122, the customer computer 104, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through a network, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. For example, the NIC 22 may be capable of connecting the computer 12 to other computing devices, such as other application servers 122, the customer computer 104, a data storage system in the merchant system 120, and the like, over the network 106 described above in regard to FIG. 1. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, or the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable medium to store and retrieve information, such as program modules, data structures, or other data. It should be appreciated by those skilled in the art that computer-readable media can be any available media that may be accessed by the computer 12, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the online shopping module 124 and/or the quote extraction module 134, both of which was described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routines 400 or 500 for extracting quotes from customer reviews and classifying the sentiment of sentences parsed from customer reviews, as described above in regard to FIGS. 4 and 5.

The computer 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display device, such as a computer monitor, a flat-panel display, a digital projector, a printer, a plotter, or other type of output device. It will be appreciated that the computer 12 may not include all of the components shown in FIG. 7, may include other components that are not explicitly shown in FIG. 7, or may utilize an architecture completely different than that shown in FIG. 7.

Based on the foregoing, it should be appreciated that technologies for extracting quotes from customer reviews are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method of classifying sentences as to sentiment, the method comprising executing instructions in a computer system to perform the operations of:

acquiring training data comprising a plurality of sentences labeled as to sentiment;

pre-processing the plurality of labeled sentences from the training data;

generating a list of terms from the plurality of labeled sentences;

determining sentiment scores for the terms in the list of terms utilizing a machine learning technique based on the plurality of labeled sentences;

receiving a collection of sentences to be classified;

pre-processing the collection of sentences;

classifying each sentence from the collection of sentences as having a neutral sentiment or a non-neutral sentiment utilizing a first logistic regression classifier trained on the sentiment scores determined for the terms in the list of terms; and classifying each sentence having a non-neutral sentiment from the collection of sentences as having a positive sentiment or a negative sentiment by applying a second logistic regression classifier trained on the sentiment scores determined for the terms in the list of terms to determine a positive score for the sentence, applying a third logistic regression classifier trained on the sentiment scores determined for the terms in the list of terms to determine a negative score for the sentence, and combining the positive score and the negative score for the sentence.

2. The computer-implemented method of claim 1, wherein the plurality of labeled sentences comprising the training data and the collection of sentences to be classified are acquired from a same corpus.

3. The computer-implemented method of claim 2, wherein the corpus comprises customer reviews regarding a category of items.

4. The computer-implemented method of claim 1, wherein the plurality of labeled sentences comprising the training data are acquired from a corpus containing data for a category of items encompassing an item referenced by the collection of sentences to be classified.

5. The computer-implemented method of claim 1, wherein the positive score for the sentence and the negative score for the sentence are combined utilizing a machine learning algorithm.

6. A system for classifying a sentence as to sentiment, the system comprising:
one or more application servers; and
a quote extraction module executing on the one or more application servers and configured to
acquire training data comprising a plurality of sentences labeled as to sentiment,
pre-process the plurality of labeled sentences from the training data,
generate a list of terms from the plurality of labeled sentences,
determine sentiment scores for the terms in the list of terms based on the plurality of labeled sentences,
receive the sentence to be classified,
pre-process the sentence, and
classify the sentence as having a neutral sentiment, a positive sentiment, or a negative sentiment utilizing a machine learning technique trained on the sentiment scores determined for the terms in the list of terms.

7. The system of claim 6, wherein pre-processing the plurality of labeled sentences comprises handling negation words in each of the plurality of labeled sentences.

8. The system of claim 7, wherein handling the negation words comprises concatenating the negation words with one or more successive words in the sentence.

9. The system of claim 7, wherein handling the negation words comprises applying a parsing algorithm to join the negation words with those words of the sentence to which the negation applies.

10. The system of claim 6, wherein pre-processing the sentence further comprises adding a token to the sentence corresponding to an overall customer rating from a consumer review from which the sentence was parsed.

11. The system of claim 6, wherein the number of terms in the list of terms is reduced by discarding those terms from the list of terms having all sentiment scores below a threshold value.

12. The system of claim 6, wherein determining sentiment scores for the terms in the list of terms comprises determining a positive sentiment score, a negative sentiment score, a mixed sentiment score, and a neutral sentiment score for each term in the list of terms utilizing a machine learning technique based on the plurality of labeled sentences.

13. The system of claim 12, wherein the machine learning technique comprises applying one or more logistic regression classifiers to the sentence having coefficients comprising the positive sentiment scores, negative sentiment scores, mixed sentiment scores, and neutral sentiment scores determined for the terms in the list of terms.

14. A non-transitory computer-readable storage medium having computer-executable instructions stored thereon that, when executed by a computer, cause the computer to:
receive a sentence parsed from a corpus; and
classify the sentence as to sentiment utilizing one or more logistic regression classifiers trained from training data comprising sentences manually labeled as to sentiment.

15. The non-transitory computer-readable storage medium of claim 14, wherein the labeled sentences comprising the training data are acquired from the same corpus as the received sentence.

16. The non-transitory computer-readable storage medium of claim 15, wherein the corpus comprises customer reviews regarding a category of items.

17. The non-transitory computer-readable storage medium of claim 15, wherein the plurality of labeled sentences comprising the training data are acquired from a corpus containing data for a category of items encompassing an item referenced by the received sentence.

18. The non-transitory computer-readable storage medium of claim 14, having further computer-executable instructions stored thereon that cause the computer to:
acquire the labeled sentences from the training data;
generate a list of terms from the labeled sentences;
determine sentiment scores for the terms in the list of terms based on the labeled sentences; and
classify the sentence as positive, negative, or neutral sentiment utilizing the one or more logistic regression classifiers having coefficients comprising the sentiment scores determined for the terms in the list of terms.

19. The non-transitory computer-readable storage medium of claim 18, having further computer-executable instructions stored thereon that cause the computer to:
pre-process the labeled sentences before generating the list of terms; and
pre-process the sentence before classifying the sentence as to sentiment.

20. The non-transitory computer-readable storage medium of claim 19, wherein pre-processing the labeled sentences comprises handing negation words in each of the labeled sentences.

21. The non-transitory computer-readable storage medium of claim 20, wherein handling the negation words comprises concatenating the negation words with one or more successive words in the sentence.

22. The non-transitory computer-readable storage medium of claim 20, wherein handling the negation words comprises applying a parsing algorithm to join the negation words with those words of the sentence to which the negation applies.

23. The non-transitory computer-readable storage medium of claim 19, wherein pre-processing the sentence further comprises adding a token to the sentence corresponding to an overall customer rating from a consumer review from which the sentence was parsed.

24. The non-transitory computer-readable storage medium of claim 18, wherein the number of terms in the list of terms is reduced by discarding those terms from the list of terms having all sentiment scores below a threshold value.

25. The non-transitory computer-readable storage medium of claim 18, wherein determining sentiment scores for the terms in the list of terms comprises determining positive sentiment scores, negative sentiment scores, mixed sentiment scores, and neutral sentiment scores for the terms in the list of terms utilizing a machine learning technique based on the labeled sentences.

26. The non-transitory computer-readable storage medium of claim 25, having further computer-executable instructions stored thereon that cause the computer to apply a first logistic regression classifier having the positive sentiment scores, the negative sentiment scores, and the mixed sentiment scores as positive coefficients and the neutral sentiment scores as negative coefficients to classify the sentence as having a neutral sentiment or a non-neutral sentiment.

27. The non-transitory computer-readable storage medium of claim 26, having further computer-executable instructions stored thereon that cause the computer to:

upon classifying the sentence as having a non-neutral sentiment, apply a second logistic regression classifier having the positive sentiment scores and the mixed sentiment scores as positive coefficients and the negative sentiment scores and the neutral sentiment scores as negative coefficients to determine a positive score for the sentence;

apply a third logistic regression classifier having the negative sentiment scores and the mixed sentiment scores as positive coefficients and the positive sentiment scores and the neutral sentiment scores as negative coefficients to determine a negative score for the sentence; and combine the positive score for the sentence and the negative score for the sentence to classify the sentence as having a positive sentiment or a negative sentiment.

28. The non-transitory computer-readable storage medium of claim 27, wherein the positive score for the sentence and the negative score for the sentence are combined utilizing a machine learning algorithm.

* * * * *